INVENTOR.
CHARLES W. RIPSCH.
by
his ATTORNEY.

Patented Jan. 5, 1937

2,066,739

UNITED STATES PATENT OFFICE 2,066,739

ELECTRIC MOTOR

Charles W. Ripsch, Dayton, Ohio, assignor to The Buckeye Portable Tool Company, Dayton, Ohio, a corporation of Ohio Application February 1, 1934, Serial No. 709,357

2 Claims. (Cl. 172—36)

This invention relates to electric motors and more particularly to a motor forming a part of a portable tool or the like. In motors of this kind the stator is usually supported in direct contact with the motor casing and the heat generated in the stator is transmitted to the casing and causes the same to become very hot. In a portable tool it is often necessary for the operator to grasp the motor casing or his hands will often come in contact therewith and the heating of the casing is highly objectionable. Further, it is usually necessary to remove the stator from the casing more or less frequently for the purpose of repairs, cleaning or replacement, and, due to the snug fit of the stator in the casing, its removal will often scar or mutilate the surface of the casing against which the stator is supported. Sometimes the attaching screws will draw the metal of the stator outwardly around the screw holes and form burrs which will deeply scar the casing. The repeated scarring of the casing will eventually so deform the same that it will no longer provide a proper support for the stator and the latter will vibrate or wobble in the casing.

One object of the invention is to provide a motor of a construction which will prevent or materially reduce the transmission of heat from the stator to the casing.

A further object of the invention is to provide a motor in which the stator will be supported in engagement with heat insulating material of such a character that it will not be easily scarred by the removal of the stator and which may be readily renewed in the event it should be objectionably scarred.

A further object of the invention is to provide a motor with a combined heat insulating member and wear plate which can be embodied therein without substantial change in the construction of the motor and at a small cost, and which will be readily removable from the casing.

A further object of the invention is to provide a motor having a readily removable stator and of such a character that neither heat nor electricity will be transmitted from the stator to the casing.

Other objects of the invention will appear as the motor is described in detail.

Figure 1:
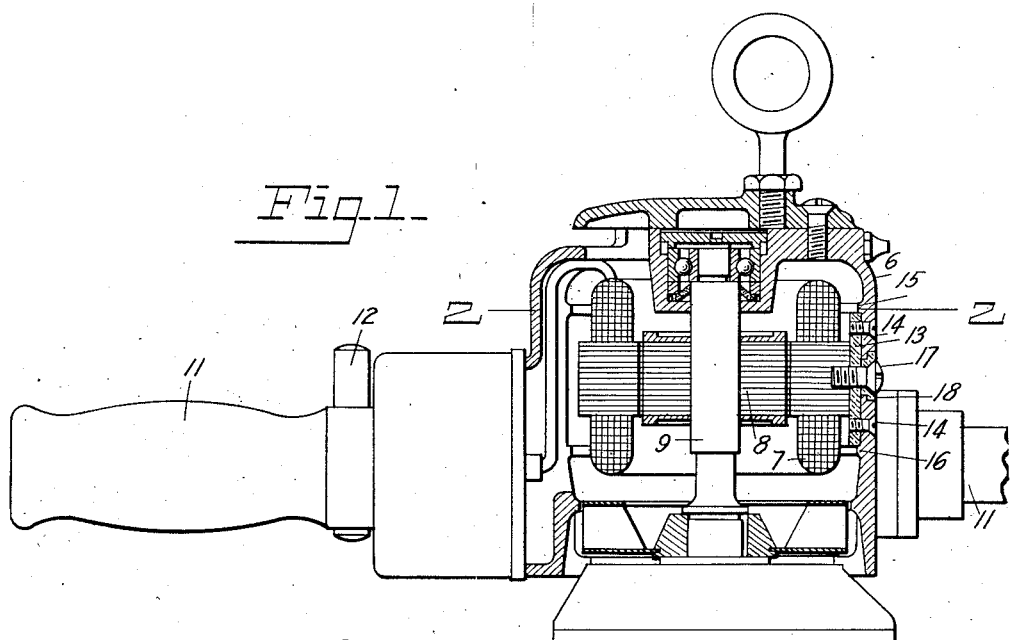
Figure 2:
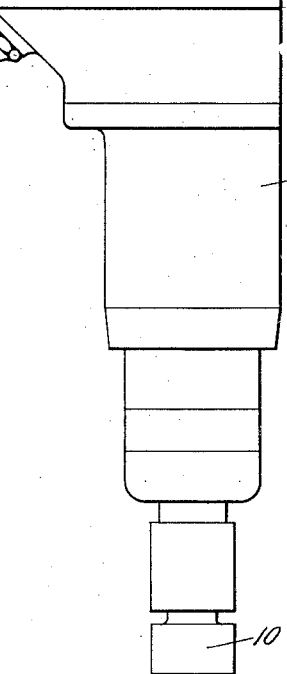

In the accompanying drawing, Fig. 1 is a side elevation of a portable tool with the motor in section and one handle broken away; and Fig. 2 is a transverse section taken on the line 2—2 of Fig. 1.

In this drawing I have shown the invention in connection with the motor of a portable tool of a well known design but it will be understood that the invention may take various forms and may be embodied in motors used on tools of various kinds, or for other purposes. The particular portable tool here illustrated comprises a body portion 5 on the upper or rear end of which is mounted a motor comprising a casing 6, stator 7 and a rotor 8 carried by a shaft 9 which is connected through suitable driving mechanism in the body portion 5 of the tool with a wrench 10, or other implement, at the lower end of the body portion. The motor casing is provided with handles 11 one of which may embody a switch 12 for controlling the operation of the motor.

In embodying my invention in a motor of the kind here shown the casing is made of an internal diameter slightly greater than the diameter of the stator so as to provide a narrow space between these parts and in this space is inserted an insulating medium of such a character that it will not only prevent, or substantially reduce, the transmission of heat from the stator to the casing but will provide an efficient wear surface which will not be easily marred or injured. The insulating medium may be of any suitable form and may comprise one or a plurality of sections. In the particular arrangement here illustrated the insulating medium comprises a plurality of strips of heat insulating material spaced one from the other about the stator and held firmly in contact with the adjacent surfaces of the stator and of the casing. This arrangement materially reduces the amount of insulating material required, and permits the ready removal of the individual strips. Further, the spacing of the strips provides passageways for the circulation of air to cool the stator, but it will be obvious that when the stator itself is of such a construction as to provide the necessary ventilation the spacing of the strips is unnecessary. The insulating material is of a non-compressible character so that it will not yield under the action of the attaching devices by means of which the stator is secured to the casing, as any yielding of this material would be apt to throw the stator off center with relation to the rotor. The material is also very hard so that it presents to the stator a hard smooth surface which will not be easily scarred by the removal or insertion of the stator, the latter being removable through one end of the casing, in the present instance in the lower end. It is desirable that the insulating material should be of such a character that it can be machined in order to reduce the insulating strip to the exact thickness required to completely fill the space between the stator and the casing. This material also has a high dielectric strength which will prevent the passage of current from the stator to the casing in the event of a short circuit in the motor. I have found that a hard non-brittle phenolic condensation product, such as that sold under the trade name "bakelite" meets all the requirements in a very satisfactory manner and it is available in various shapes, either with or without reinforcing material embedded therein, but it will be obvious that any material having a low heat conductivity and having the necessary characteristics may be used.

In preparing the insulating strip or strips I prefer to utilize a flat annular strip or ring of suitable material of a diameter approximately equal to the internal diameter of the motor casing and to then machine this ring to provide it with the desired thickness and with the proper inner and outer diameters. It is not usually desirable to extend the insulating strip entirely about the stator and I prefer to employ a plurality of relatively short strips, three such strips being shown at 13 as spaced about the stator substantially equal distances. Therefore, after the ring has been reduced to the desired thickness, I sever the same into a plurality of segments, 13, one ring thus providing a sufficient number of short strips or segments to insulate several motors. The insulating strips are inserted in the motor casing prior to the insertion of the stator and are attached to the casing in such a manner as to cause them to be held in position while the stator was being inserted. In the present instance, this is accomplished by passing small screws 14 through the wall of the casing and threading the same into suitable openings provided in the insulating strips. While the screws 14 may be sufficient ordinarily to retain the strips in position during the insertion and removal of the stator I prefer to provide the casing with upper and lower shoulders 15 and 16 spaced apart a distance substantially equal to the width of the insulating strip so that the latter will fit snugly between the same. When the several insulating strips have been inserted in position as described the stator is inserted and when it has been properly located is secured within the casing by means of suitable attaching devices. These attaching devices are here shown as screws 17 extending through the usual screw holes in the wall of the casing, through openings formed in the respective strips and threaded into the stator. The tightening down of these screws will rigidly secure the stator, insulating strips and casing one to the other with their adjacent surfaces in contact one with the other. If desired, the screw holes in the wall of the casing may be enlarged and bushings 18 of insulating material inserted therein to provide for complete electrical insulation between the stator and the casing.

The heat insulating strips being of a hard non-compressible character will not yield under the pressure of the stator when the screws 17 are tightened down but will serve to accurately locate the stator with relation to the rotor, and they will not be easily scarred upon removal or insertion of the stator. However, in the event they should be so scarred they can be easily removed and renewed at small cost. It will be apparent that the combined heat insulating member and wear plate can be embodied in the motor with little or no change in the construction thereof and at very small expense.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor comprising a casing and a stator within said casing, a plurality of strips of hard non-compressible material of low heat conductivity spaced about said stator between the same and said casing and shaped to conform to the contour of said casing, said casing having shoulders engaging the opposite edges of said strips, and attaching means extending through the wall of said casing and through the respective strips to rigidly support said stator in firm engagement with said strips.

2. In a motor comprising a casing and a stator within said casing, a plurality of strips of hard non-compressible material of low heat conductivity spaced about said stator between the same and said casing and shaped to conform to the contour of said casing, means for securing said strips to said casing independently of said stator, and means for securing said stator to said casing and holding the same in firm contact with said strips.

CHARLES W. RIPSCH.